July 2, 1968 L. W. FABRY 3,391,304

FLASHER CIRCUIT EMPLOYING A SILICON CONTROLLED RECTIFIER LAMP CIRCUIT WITH AN ADDITIONAL EXTINGUISHING CIRCUIT

Filed Aug. 28, 1967

INVENTOR.
LLOYD W. FABRY

BY Kegan, Kegan & Berkman

ATT'YS 3,391,304

FLASHER CIRCUIT EMPLOYING A SILICON CONTROLLED RECTIFIER LAMP CIRCUIT WITH AN ADDITIONAL EXTINGUISHING CIRCUIT

Lloyd William Fabry, Wilmette, Ill., assignor to Aeroflash Signal Corporation, Chicago, Ill., a corporation of Illinois Continuation-in-part of application Ser. No. 357,517, Apr. 6, 1964. This application Aug. 28, 1967, Ser. No. 663,861
6 Claims. (Cl. 315—178)

ABSTRACT OF THE DISCLOSURE

An apparatus for alternately flashing a pair of high intensity iodine vapor lamps, said apparatus comprising a variable frequency unijunction transistor pulse generator for sequentially firing first, second and third silicon controlled rectifiers. Said first and second silicon controlled rectifiers each feeding one of a pair of transistor power amplifiers for energizing each lamp. The third silicon controlled rectifier being effective to quench conduction in the first and second silicon controlled rectifiers. The invention further comprising a fresnel dome enclosing each of the high intensity lamps for refracting light therefrom in circular omni-directional patterns.

This application is a continuation-in-part of application Ser. No. 357,517, filed Apr. 6, 1964, now abandoned, and the invention relates to an improvement in lighting and signalling apparatus. More particularly, the invention is directed to a flasher circuit effective to provide an intense light source or beam observable at relatively great distances. In a specific application the flasher circuit of the invention finds utility as an aircraft lighting and signalling device.

Many types of flasher circuits are known in the prior art and these circuits have taken numerous and varied physical forms and electrical arrangements. Nevertheless, no completely satisfactory flasher apparatus has heretofore been produced. In each case, one or more undesirable or objectionable features have been recognized, and no prior art flasher circuit has proven completely satisfactory for the purpose intended. It is therefore, the aim of this invention to provide a more efficient, more reliable, and more effective flasher circuit.

It is a principal object of this invention to provide a flasher circuit in which the circuit components are very small, physically, are relatively inexpensive, and are light in weight and which at the same time produce alternating light beams of very high intensity.

Another object of the invention is to provide a light flasher circuit of improved stability and reliability, which generates a minimal amount of heat.

Still another object of the invention is to provide a light flasher circuit in which the bulbs or lamps have an extraordinarily long life, and which is economical in operation.

Yet another object of the invention is to provide a light flasher circuit which may be operated by the existing power supplies on an airplane, and which requires no auxiliary transformers or similar equipment.

Another important object of the invention is to provide a flasher apparatus which alternately flashes a pair of high beam candle power iodine vapor lamps through a pair of fresnel domes to provide an alternating high-intensity circular omni-directional lighting pattern.

An additional object of the invention is to provide a flasher circuit in which the frequency of flashing is readily adjustable.

A related object of the invention is to provide a lighting circuit which requires little maintenance or attention and which, therefore, is particularly suitable for installation in locations, such as in high ceilings, which are not easily accessible for service. With the proper selection of circuit parameters, a "flickering" light is obtained.

Figure 1:
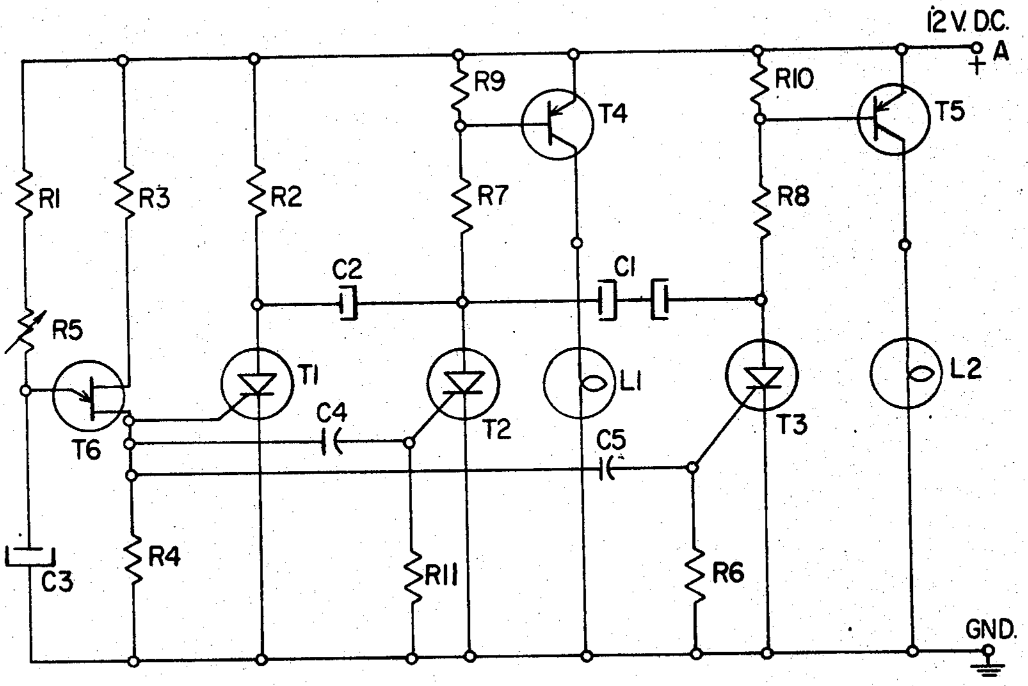
Figure 2:
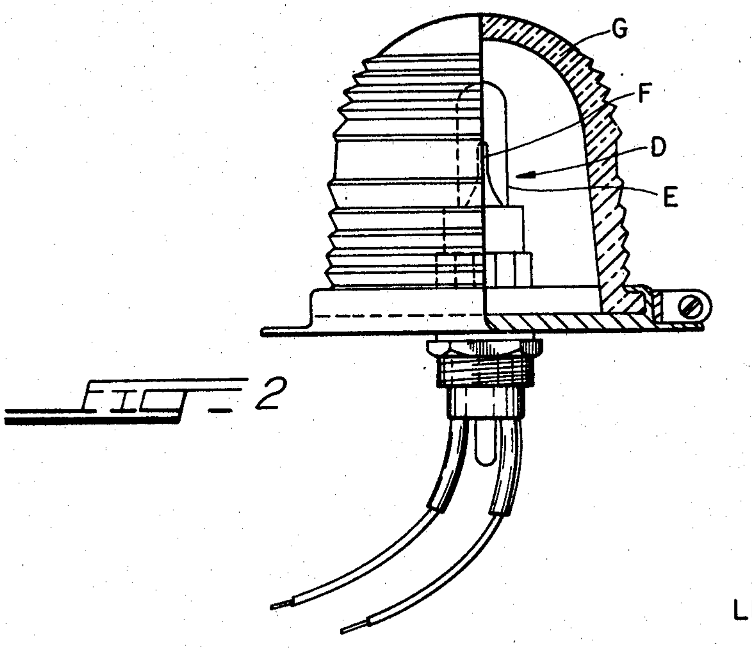

Other and further objects and advantages of the invention will become apparent from a reading of the following specification taken in conjunction with the drawings in which:

FIGURE 1 is a circuit diagram of a light flasher circuit embodying the principles of the invention; and FIGURE 2 is a schematic representation illustrating an iodine vapor lamp and fresnel dome used in the practice of the invention.

Referring now to the drawings, and particularly to FIGURE 1, for purposes of disclosure, the flasher circuit is shown embodied as a "flip-flip" circuit which is the electronic analogue of an electric switch. Two pulse-responsive current flow control elements, T2 and T3 constitute the flip-flop itself. Transistor T1 operates positively to turn off T2 and T3 to prevent any possibility of either element T2 or T3 remaining conductive due to transient voltage variations, and thereby disrupting the alternate flashing activity. In the preferred embodiment of the circuit depicted, elements T1, T2 and T3 are silicon controlled rectifiers (SCR's) type C106Q3. The pulse generating transistor T6 is a type 2N2646 unijunction transistor. The trigger circuit includes resistor R3 connected between a base of the unijunction transistor T6 and the positive side of the power supply, resistor R4 connected between the other base of the unijunction T6 and ground, and resistor R5 which is a potentiometer connected between the control element of the unijunction T6 and resistor R1, the other end of which is connected to the positive side of the power supply. Potentiometer R5 serves to adjust the pulse frequency. A capacitor C3 is connected between the control element of the unijunction T6 and ground. In the preferred circuit depicted, R1 is 100,000 ohms, R3 is 470 ohms, R4 is 47 ohms, R5 is a 250,000 ohm potentiometer, and C3 is 3.3 microfarads.

The silicon controlled rectifiers T1, T2, and T3 are connected in parallel, bridging the power supply. SCR T1 is provided with a 3.3K ohm load resistor R2. SCR's T2 and T3 are each provided with 18 ohm and 470 ohm load resistors R7 and R9, and R8 and R10 which also serve as bias resistors across the input means for the current amplifier means, power transistors T4 and T5. Capacitor C1, consisting of two 5 microfarad capacitors connected in series, is connected between the anode of SCR's T2 and T3. Capacitor C2 is 15 microfarads and is connected between the anodes of SCR's T1 and T2. Bias resistors R11 and R6 are each 470 ohms and serve to bias the gates of SCR's T2 and T3 negatively. Capacitors C4 and C5 are each .02 microfarad and serve to couple signal pulses from the unijunction T6 to the gates of SCR's T2 and T3 respectively. The gate of SCR T1 is directly connected to the unijunction T6.

Power transistors T4 and T5 are type 7E43, and are current amplifiers triggered by SCR's T2 and T3. Iodine vapor lamps L1 and L2 are connected from the bases of transistors T4 and T5 respectively to ground. L1 and L2 are each a 12 volt T3 single ended quartz iodine lamp shown in FIGURE 2 (Sylvania Electric Products, FL #303) having a double contact bayonet type base (not shown) supporting a quartz envelope E containing a tungsten-type filament F. The envelope contains elemental iodine. Each bulb L1 and L2 is rated at 103 watts, provides 150 candle power, measured at ten feet, and is mounted in a fresnel dome G which refracts the light in a circular omni-directional pattern.

The operation of the circuit is as follows:

Upon the application of postitive voltage to terminal A, the anode of SCR T2 is made positive by conduction of current through resistors R9 and R7. When the anode of SCR T2 is sufficiently positive, a pulse received on the gate of SCR T2 from the unijunction T6 renders SCR T2 conductive. Capacitor C1 then charges through resistors R8 and R10 to build up a positive voltage on the anode of SCR T3, this voltage enabling SCR T3 to conduct when the following pulse is received on its gate. As SCR T3 conducts, it discharges capacitor C1 thus reducing the positive charge on the anode of SCR T2 below a value required to sustain conduction.

As SCR T3 conducts, capacitors C1 and C2 become charged through resistor R2, building up a positive potential on the anode of SCR T1 sufficient to render SCR T1 conductive when the next pulse is applied to its gate. When SCR T1 becomes conductive, it reduces the potential on the anode of T3 turning it off and discharges capacitors C2 and C1 so that the potential on the anode of SCR T1 is reduced below that required to sustain conduction. At the following pulse, SCR T2 fires to begin the next cycle. The operation of this flip-flop circuit follows a three-pulse pattern, the first pulse firing SCR T2, and the second pulse firing SCR T3. The third pulse fires SCR T1, which assures completion of the cycle and precludes T2 or T3 from remaining conductive due to any transient voltages present in the circuit. It will be readily seen that the firing order of T1, T2 and T3 could be changed by variations in the component values of their associated charging networks.

Transistors T4 and T5 operate as common emitter current amplifiers, taking the load off of the SCR's by which they are driven, and permitting use of relatively inexpensive low current SCR's T2 and T3 as the flip-flop switching devices. As a result, lower value commutator capacitors may be used for the SCR's. Another advantage obtained through the use of the transistor amplifiers is higher lamp illumination due to a minimum amount of series voltage drop to each lamp. When SCR T2 or T3 conducts, the resultant current alternately applied between the base and emitter the corresponding transistors T4 and T5 causes a much higher current pulse to flow in the collector circuit of each said transistors, which current pulse alternately flashes the corresponding lamp L1 or L2.

It will be understood that the voltage values and the circuit parameters here given are intended by way of example only, and not as a limitation. For example, it is obvious to persons skilled in the art of electronics that different transistors may be used, different power supplies may be employed, and that these and related considerations will dictate what circuit values must be employed.

While disclosures of preferred embodiments of the invention and preferred circuit parameters and potentials have been provided, it will be apparent to those skilled in the art that numerous modifications, changes, and variations can be made without departing from the essential spirit of the underlying principles of the invention. It is, therefore, desired by the following claims to include within the scope of the invention all such variations and modifications by which substantially the results of this invention may be obtained through the use of substantially the same or equivalent means.

What is claimed is:

1. A high intensity lamp flasher circuit comprising in combination:

a current source;

first, second, and third parallel electrical circuits bridging said current source;

a first pulse-responsive current flow control element, and first amplifier input means connected in series therewith;

a second pulse-responsive current flow control element, and second amplifier input means connected in series therewith;

a third pulse-responsive current flow control element for quenching electrical conduction of said first and second pulse-responsive current flow control elements;

a first current amplifier connected to said first amplifier input means, and a first load connected to said first amplifier, said first load comprising a first high intensity lamp;

a second current amplifier connected to said second amplifier input means, and a second load connected to said second amplifier, said second load comprising a second high intensity lamp;

means for producing electric control pulses in automatic sequence to actuate said pulse-responsive current flow control elements to conduct;

impedance means in each of said parallel electrical circuits effective to establish a selective relationship between said control pulses and said current flow control elements to render said elements sequentially conductive and non-conductive to provide alternate energization of said first and second amplifiers, and thereby alternately to illuminate and quench said first and second high intensity lamps.

2. In a light flasher circuit for alternately flashing a pair of high intensity electric lamps, including first and second pulse-responsive current flow control elements, and means for producing electrical control pulses in automatic sequence for actuating electrical conduction alternately in said first and second elements, the improvement comprising:

a third pulse-responsive current flow control element for quenching conduction in said first and second current flow control elements;

a first current amplifier connected between said first control element and one lamp of said pair of lamps; and a second current amplifier connected between said second control element and the other lamp of said pair of lamps.

3. The invention set forth in claim 2 wherein said third pulse-responsive current control element is connected in parallel with said first and second pulse-responsive current flow control elements.

4. The invention set forth in claim 1 and further comprising a first fresnel dome enclosing said first high intensity lamp, and a second fresnel dome enclosing said second high intensity lamp, each of said domes being effective to refract light from each of said lamps in a circular omnidirectional pattern.

5. The invention set forth in claim 2 and further comprising a first fresnel dome enclosing said first high intensity lamp, and a second fresnel dome enclosing said second high intensity lamp, each of said domes being effective to refract light from each of said lamps in a circular omnidirectional pattern.

6. The invention set forth in claim 1 and further comprising variable resistance means for adjusting said means for producing electric control pulses, said variable resistance means being effective to vary the frequency of the electrical control pulses, and thereby to vary the flash rate of said lamps.

References Cited

UNITED STATES PATENTS

| | | | |
|---|---|---|---|
| 2,764,670 | 9/1956 | Van Dusen | 240—1.2 |
| 2,773,172 | 12/1956 | Pennow | 240—1.2 |
| 3,113,241 | 12/1963 | Yonushka | 315—200 |
| 3,283,206 | 11/1966 | Utt et al. | 315—201 |
| 3,310,708 | 3/1967 | Seidler | 315—225 |

JAMES W. LAWRENCE, *Primary Examiner.*

C. R. CAMPBELL, *Assistant Examiner.*